April 7, 1959

J. COLIN 2,880,870

PRESSURE SCREENING

Filed Aug. 30, 1954

INVENTOR
JULES COLIN

BY
ATTORNEYS

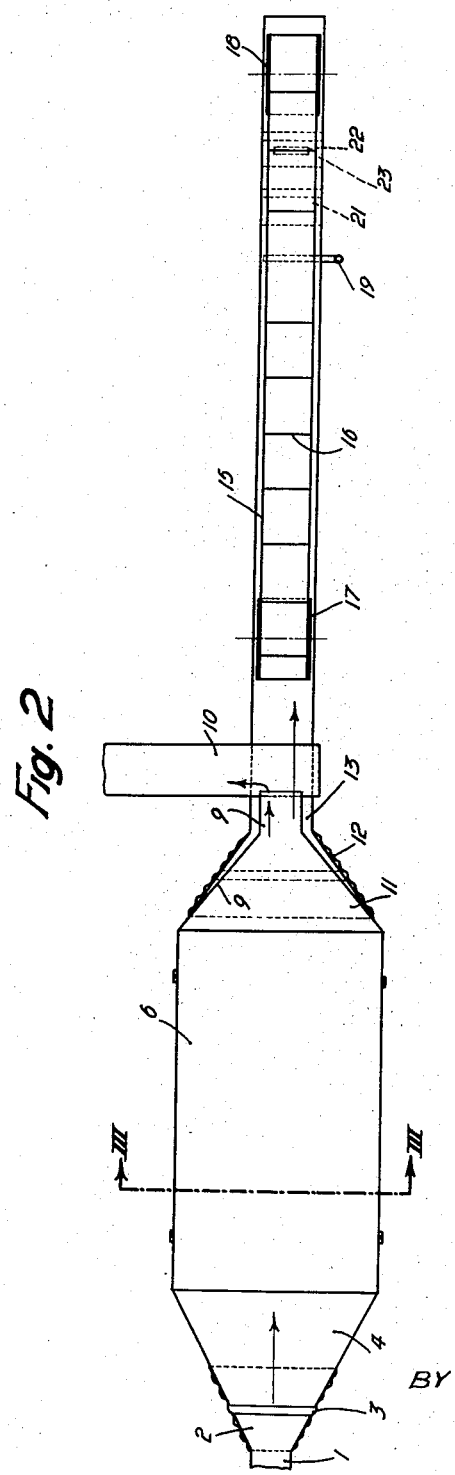
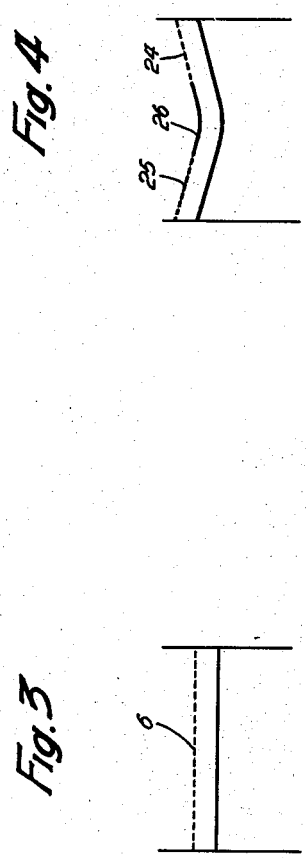
INVENTOR
JULES COLIN
ATTORNEYS

United States Patent Office 2,880,870
Patented Apr. 7, 1959

2,880,870

PRESSURE SCREENING

Jules Colin, Paris, France, assignor to Societe Anonyme des Chaux et Ciments de Lafarge et du Teil, Paris, France, a corporation of France Application August 30, 1954, Serial No. 452,785

Claims priority, application France March 19, 1954

6 Claims. (Cl. 209—269)

The present invention concerns the separation in a liquid medium, of solid materials of a predetermined size, by means of screening operations conducted under pressure.

It is common practice to conduct the sizing separation of solid materials by admitting the product to be treated on the screening surface of a screen, which may be fixed or vibrating. The elements which are of smaller dimensions than those of the aperture of the screen fall through the screening surface while grains or granules which are of a greater size slide on the screen surface and constitute the oversize particles. The efficiency of the screening operation obviously depends, amongst other factors, upon the proportion of elements with critical size, i.e. of dimensions comprised between ¾ and 1.5 times the aperture of the adopted screen.

When, according to known methods, a sizing separation of solids has to be conducted in a liquid medium, the pulp drops freely on a wearing part placed on the screening surface (generally a piece of a rejected conveyor belt) and reaches thereafter the screen cloth or the wedge wire of the screen. A flow of liquid carrying fine elements immediately passes through the screening surface but, after a short run on this surface, the remaining pulp contains only a reduced proportion of liquid. The efficiency of the screening operation is then very substantially reduced due to the agglomeration of the solid elements and due to the clogging of the screening surface by fine elements which, with the assistance of surface tension, form a paste which clogs the apertures of the screen. The effective length of the screen is thus cut down to a few decimeters and the screen should be abundantly washed at several points in order to destroy the agglomeration and to carry away the fine elements which have not been separated at the inlet of the screening surface. Such a washing operation is not always possible (for cement raw slurries for instance), and it then is necessary to accept a large proportion of undersized elements in the oversize and to screen with only fairly large apertures.

The present invention obviates the drawbacks of the conventional screening operations and its object is a method for such a separation and a device for working said method.

The method for the sizing separation of solids in a liquid medium, according to the present invention, essentially consists in introducing a pulp or slurry containing said solids in a liquid medium into a downwardly inclined passageway of a box or container of which the bottom and the vertical walls are liquid tight and the upper portion of which plays the part of a screen of a predetermined mesh, compressing said pulp in said container under such a pressure that the solid elements which are finer than said mesh pass through the screen from the lower face towards the upper face at an accelerated speed, collecting said finer elements in a waste-weir, directing the solid elements larger than said mesh, or oversize particles, left in the lower portion of the container to a conveyor, washing said oversize particles while they are being conveyed, in recuperating the fine elements possibly carried along by said washing operation and evacuating said oversize particles.

The advantages of the method according to the present invention, with respect to the conventional screening, are as follows:

The screening operation being entirely effected in a liquid medium, the fine elements pass very easily through the screening surface.

It is possible to supply the pulp or slurry to the screen under a certain pressure. Due to the inclination of the screen, this pressure will increase in the direction in which the pulp progresses; so the speed at which the fraction containing the fine elements passes through the screening surface will be greatly increased, which makes it possible to considerably reduce the screening surface.

The result is that the size separation may be effected with a much finer mesh than in the usual operational procedure.

The device for working such a method comprises fundamentally a pulp supply conduit, the flared end of which is flexibly and tightly connected to the inlet of a screen inclined at a certain angle, constituted by a box or container of which the bottom and vertical walls are liquid tight and the upper portion of which comprises a screen, the outlet of said box below said screen being tightly and flexibly connected to the lower end or sump of a casing containing an elevator, and the screening portion of the box terminating opposite the aperture of an inclined evacuation conduit associated with said box and terminating above a collecting gutter.

The elevator is constituted by an endless chain inclined to the horizontal and passing around two pulleys one of which is driving, the unit thus constituted being surrounded by a liquid tight casing extending to a height greater than that of the level of the pulp which it contains. Scrapers or flights are carried by said chain perpendicularly to its outer face, and they are perforated with slots of a width equal to that of the aperture of said screen. At a certain distance from the end of the run of the lower portion of the chain, a conduit for supplying a rinsing liquid for the oversize particles opens above said lower portion of the chain, an aperture being provided under said chain for evacuating said oversize particles. Upstream of said aperture, a washing ramp opens under the chain, above an evacuation funnel provided under said chain.

The screen surface of the screen may be constituted by a perforated metal sheet, by a metal or textile cloth or by a wedge wire screen.

The screen may be fixed, shaking, vibrating or of any other similar type.

The present invention is explained in greater detail hereinafter with reference to the appended drawings, illustrating an example of embodiment and wherein:

Fig. 2 is a plan view of same.

Figs. 3 and 4 are diagrammatical views in vertical section of the box of Figure 1, along line III—III in Figure 1, and showing two embodiments of the filtering portion of the screen.

Figure 1:
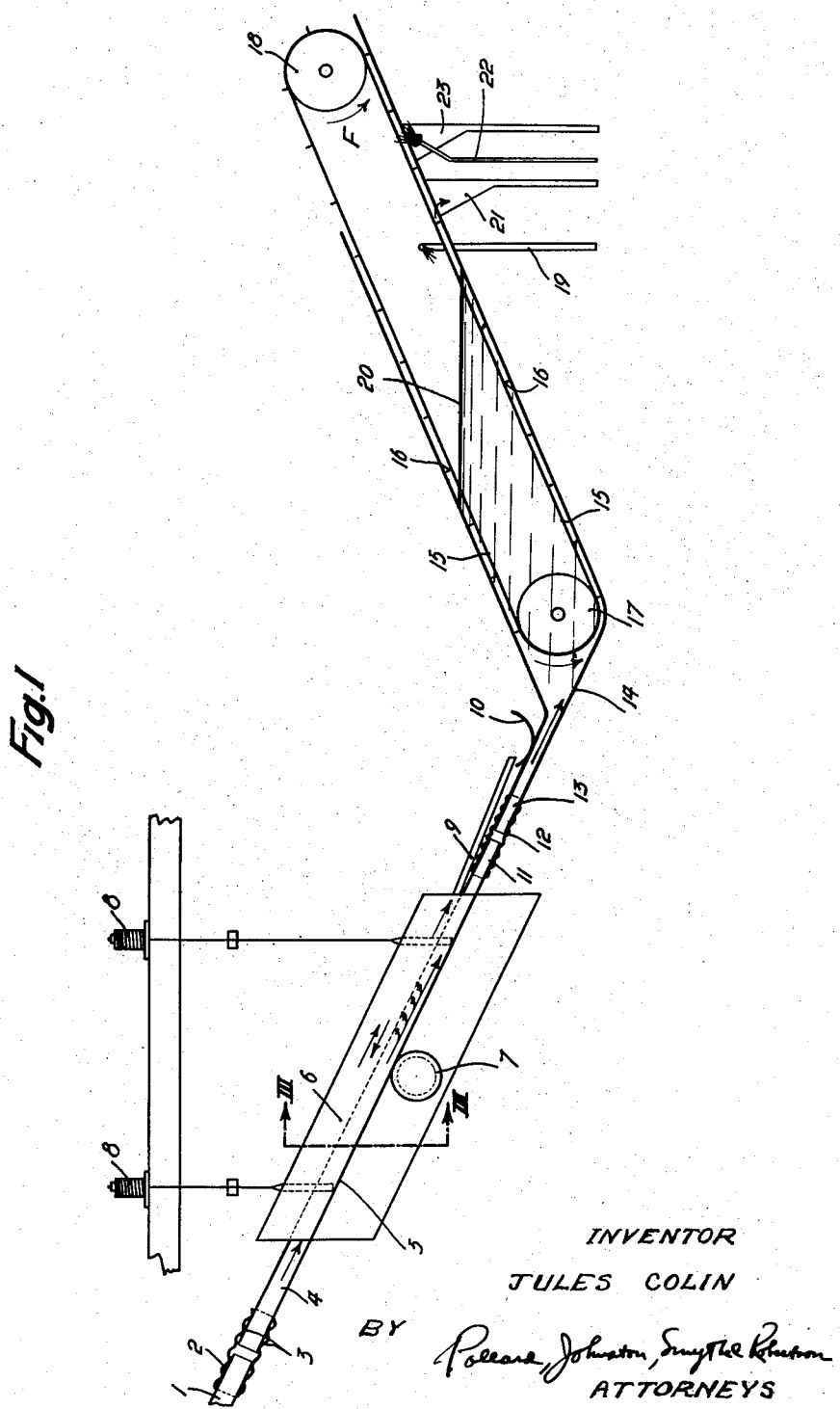
Fig. 1 is a diagrammatical view, in longitudinal section, of the device according to the present invention.

As illustrated in the drawings, the device according to the present invention comprises a fixed conduit 1 flared at 2 and connected by a tight flexible sleeve 3 with the closed channel 4, of a trapezoidal shape, constituting the inlet to the screen.

The screen consists of a box or casing the bottom 5 and the vertical walls of which are liquid tight and rigid, made of sheet iron, for instance, and the upper portion 6 of which is a screen. The unit is inclined from the horizontal to a certain angle and is preferably vibrated by any known means such as, for instance, an unbalancing shaft 7 and a flexible and elastic suspension referenced generally at 8.

The screening surface has its outlet in front of the evacuation channel 9 which is associated with the screen and extends over the collecting gutter 10 with a sufficient slope that the screened fraction containing the fine elements of the pulp may flow away by gravity.

The lower end of the screen is terminated, at the outlet therefrom, by a trapezoidal channel 11, a flexible and liquid tight sleeve 12 and a fixed conduit 13 associated with a liquid tight casing 14 in which is arranged a belt or chain-type elevator 15 provided with scrapers 16 having slits of the size of the apertures of the screen. The belt is movable over pulleys 17, 18, one or the other of which or both are driving in the direction of the arrow F.

A washing conduit 19, arranged for rinsing the oversize above the level of the pulp 20, precedes the evacuation opening 21 for the oversize, a supply pipe 22 for washing the scrapers and an evacuation funnel 23.

In Figure 3 is illustrated one form of embodiment of the screening surface of the screen wherein the transverse section of this surface is rectilinear.

In Figure 4, a modified embodiment is illustrated of such a screening surface, wherein the latter is constituted by two inclined surfaces 24, 25, arranged on either side of a gutter 26 made of solid sheet iron.

The operation of such a device and the screening method using such a device are as follows:

The pulp to be screened arrives at 1, passes under the screen and is distributed, owing to the trapezoidal shape of the channel 4, throughout the entire width of the screen.

The elevator having been started and the unbalanced shaft 7 being rotated, the pressure imparted to the pulp obliges the solid particles contained in said pulp and which are finer than the meshes of the screen surface to go through this surface into the container space or chamber over the upper portion of the screen 6. There, the mixture of these particles or fine elements and liquid flows over the screening surface 6, which will be assumed to take the shape of the embodiment illustrated in Figure 3, and drains off through the outlet at 9 from which it falls into the evacuation gutter 10.

In case the screening surface assumes the form of embodiment illustrated in Figure 4, the mixture of fine particles and liquid flows laterally towards the central axial gutter 26 which extends over the whole length of the screen and discharges the screened mixture into the gutter 10.

The solid elements having sizes greater than the mesh of the screen pass beneath the screen into the conduit 13, and, when they reach the sump of casing 14, they are picked-up by the conveyor flights 16 and carried along the upwardly sloped bottom wall of the casing through a path in which they are rinsed, after rising above the level of the pulp or slurry 20, by a washing liquid supplied through the conduit 19. After passing through the rinsing zone, the coarser solids fall into the recuperator 21 by which they are removed from the system.

The flights are then washed at 22 and the rinsing liquid is evacuated at 23.

What I claim is:

1. A pressure-screening apparatus for continuously classifying solid-liquid mixtures having a high proportion of solids, such as raw cement slurries, comprising a downwardly inclined screening unit for the slurry, said screening unit being defined by a downwardly sloped liquid-tight bottom wall, liquid-tight side walls and a downwardly sloped foraminous screen spaced a short distance above said bottom wall and mounted in rigidly fixed relation to said side walls, means for continuously vibrating said walls and said screen together, a downwardly inclined conduit extending above and connected with the upper end of said screening unit for continuously supplying slurry to said upper end at a location below said screen under a pressure such that the solids finer than the mesh of said screen pass rapidly upwards through the said screen, a liquid-tight chamber above said screen to collect the mixture of finer solids and liquid passing through and over said screen; means for continuously conducting said mixture out of said chamber, a liquid-tight container having a sump below the lower end of said screening unit, means connecting said lower end with said sump for continuously conducting the coarser solids by gravity from beneath said screen into said sump, and continuously operative conveyor means for removing the coarser solids from the liquid in said container while maintaining constant the level of liquid in the said apparatus.

2. A pressure-screening apparatus for continuously classifying liquid slurries having a high proportion of solids, comprising a downwardly inclined screening unit for the slurry, said screening unit being defined by a downwardly sloped liquid-tight bottom wall, liquid-tight side walls and a downwardly sloped foraminous screen spaced a short distance above said bottom wall and mounted in rigidly fixed relation to said side walls, a downwardly inclined conduit extending above and connected with the upper end of said screening unit for continuously supplying slurry to said upper end at a location below said screen under a pressure such that the solids finer than the mesh of said screen pass rapidly upwards through the said screen, a liquid-tight chamber above said screen to collect the mixture of finer solids and liquid passing through and over said screen, means for continuously conducting said mixture out of said chamber, a liquid-tight container having a sump below the lower end of said screening unit, means connecting said lower end with said sump for continuously conducting the coarser solids by gravity from beneath said screen into said sump, continuously operative conveyor means for removing the coarser solids from the liquid in said container while maintaining constant the level of liquid in the said apparatus, and means for continuously vibrating said walls and said screen together to keep the finer and coarser solids respectively flowing freely through and beneath said screen.

3. An apparatus as claimed in claim 1, in which said chamber is defined by a liquid-tight top wall forming with said bottom wall and said side walls an integral downwardly sloped casing partitioned by said screen.

4. An apparatus as claimed in claim 3, further comprising flexible elastic suspension means for supporting said casing, and means including an out-of-balance rotary member mounted on said casing for continuously vibrating said casing.

5. An apparatus as claimed in claim 2, in which said container comprises a sloped lower wall extending upwardly from said sump beyond the liquid level in said container, said sloped wall having a discharge opening formed therein at a location spaced above said liquid level, said conveyor means being movable along said sloped wall to move the coarser solids to said discharge opening, and means for applying a washing and rinsing liquid to such solids as they approach said opening.

6. An apparatus as claimed in claim 5, further comprising means for recuperating such fine solids as may be carried away by said rinsing liquid.

References Cited in the file of this patent

UNITED STATES PATENTS

| | | |
|---|---|---|
| 1,468,261 | Collins | Sept. 18, 1923 |
| 1,491,211 | Taylor | Apr. 22, 1924 |
| 1,777,182 | Roethlius | Sept. 30, 1930 |
| 2,196,451 | Holzer | Apr. 9, 1940 |
| 2,311,279 | Parks | Feb. 16, 1943 |
| 2,570,035 | Laughlin | Oct. 2, 1951 |
| 2,708,032 | Heyman | May 10, 1955 |